United States Patent [19]
Ginetti et al.

[11] Patent Number: 6,086,621
[45] Date of Patent: Jul. 11, 2000

[54] LOGIC SYNTHESIS CONSTRAINTS ALLOCATION AUTOMATING THE CONCURRENT ENGINEERING FLOWS

[75] Inventors: Arnold Ginetti, Antibes; Francois Silve, Mouamf-Sartoux, both of France

[73] Assignee: VSLI Technology, Inc., San Jose, Calif.

[21] Appl. No.: 09/075,847

[22] Filed: May 12, 1998

[51] Int. Cl.[7] .................................................. G06F 3/00
[52] U.S. Cl. ................ 703/19; 395/500.07; 395/500.08; 395/555
[58] Field of Search ..................... 364/488, 489, 364/490, 491; 395/558, 550, 555, 500.02, 500.07, 500.08; 703/19

[56] References Cited

U.S. PATENT DOCUMENTS

| | | | |
|---|---|---|---|
| 5,572,436 | 11/1996 | Dangelo et al. | 364/489 |
| 5,778,216 | 7/1998 | Venkatesh | 395/558 |
| 5,870,308 | 2/1999 | Dangelo et al. | 364/489 |

*Primary Examiner*—Kevin J. Teska
*Assistant Examiner*—Thai Phan
*Attorney, Agent, or Firm*—Burns Doane Swecker & Mathis L.L.P.

[57] ABSTRACT

A method and a system allocate a budget to a circuit design. A timing analysis is prepared for a circuit and a budget is automatically allocated to each of the blocks of the circuit.

8 Claims, 4 Drawing Sheets

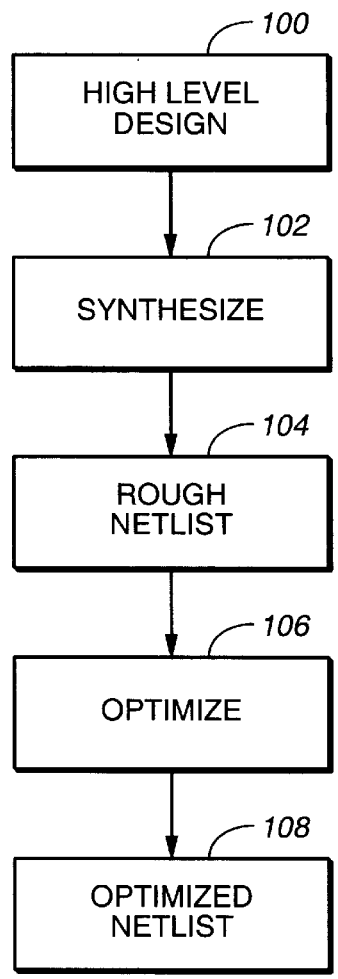
FIG._1A
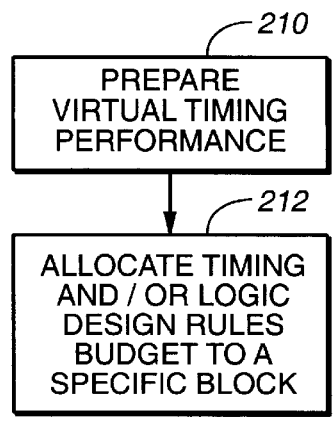
FIG._2
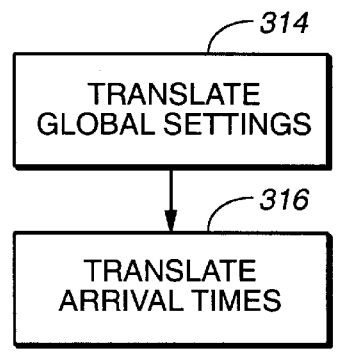
FIG._3
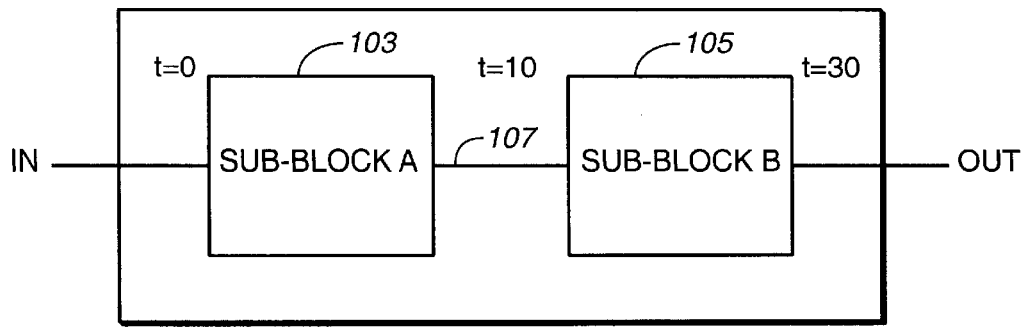
FIG._1B

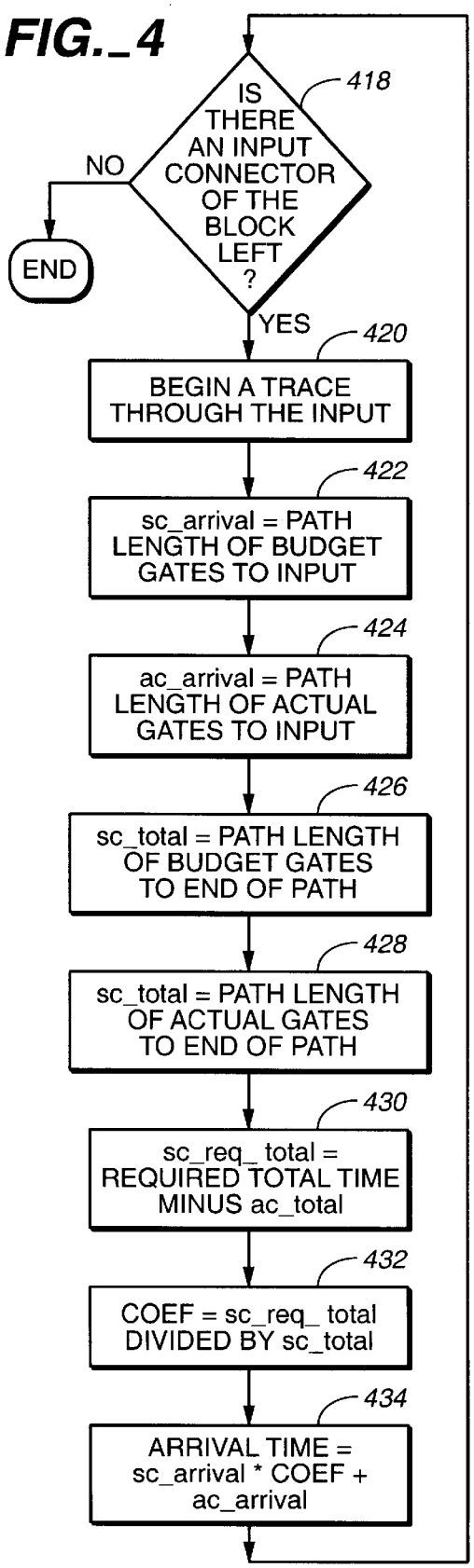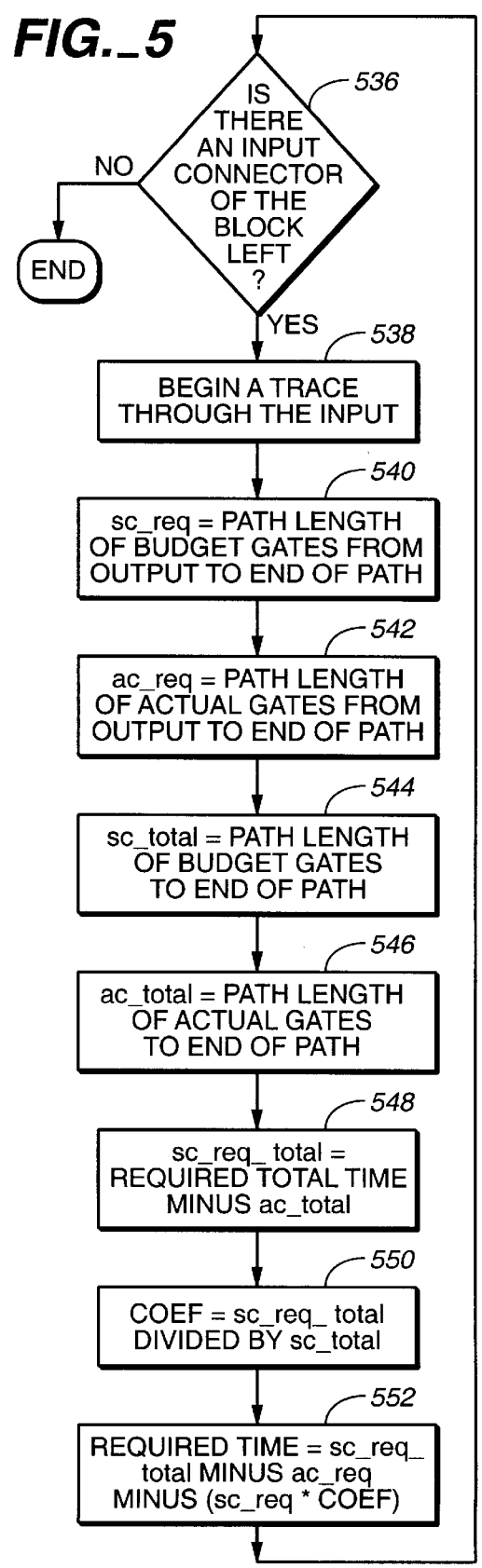

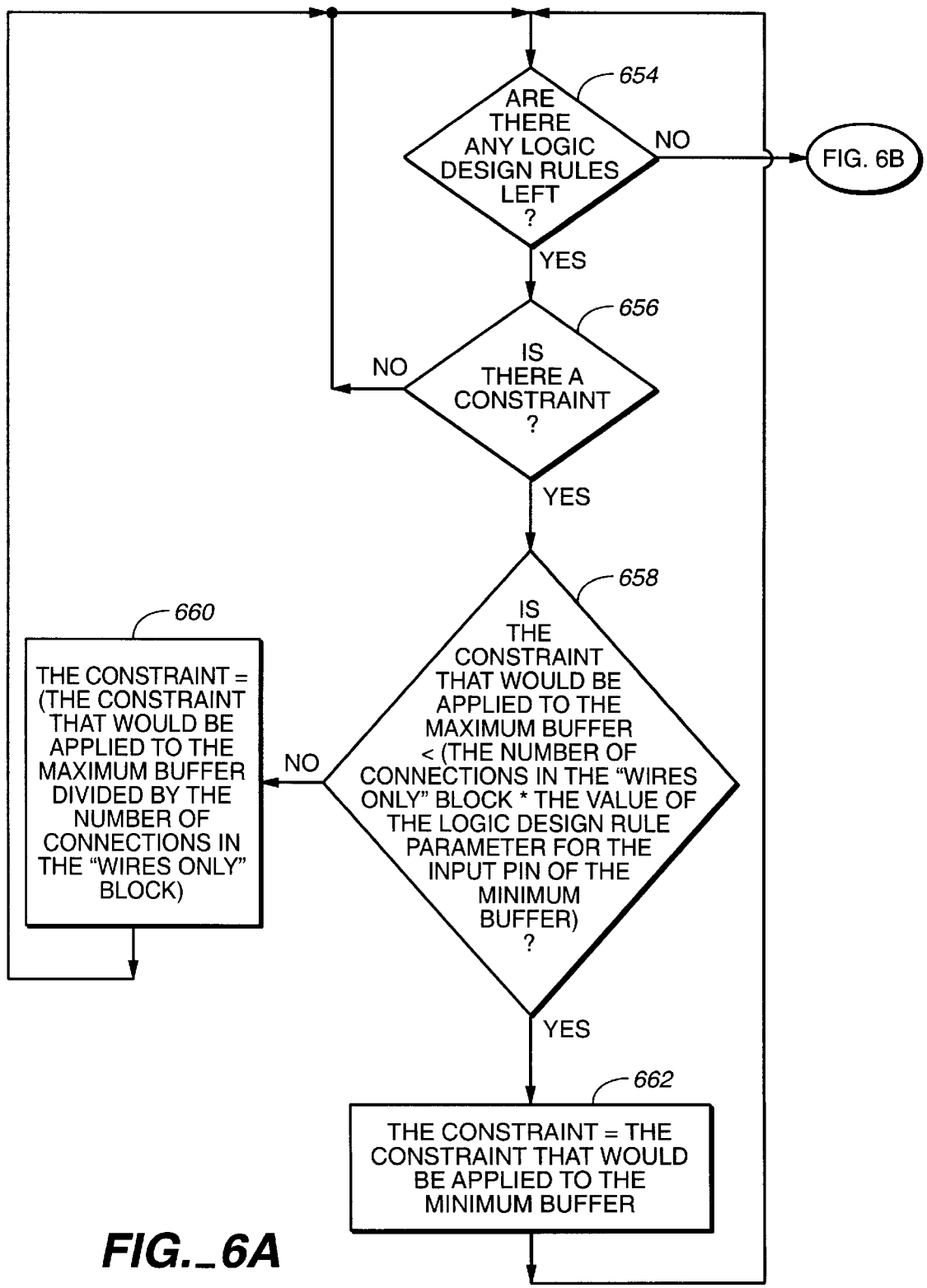
FIG._6A

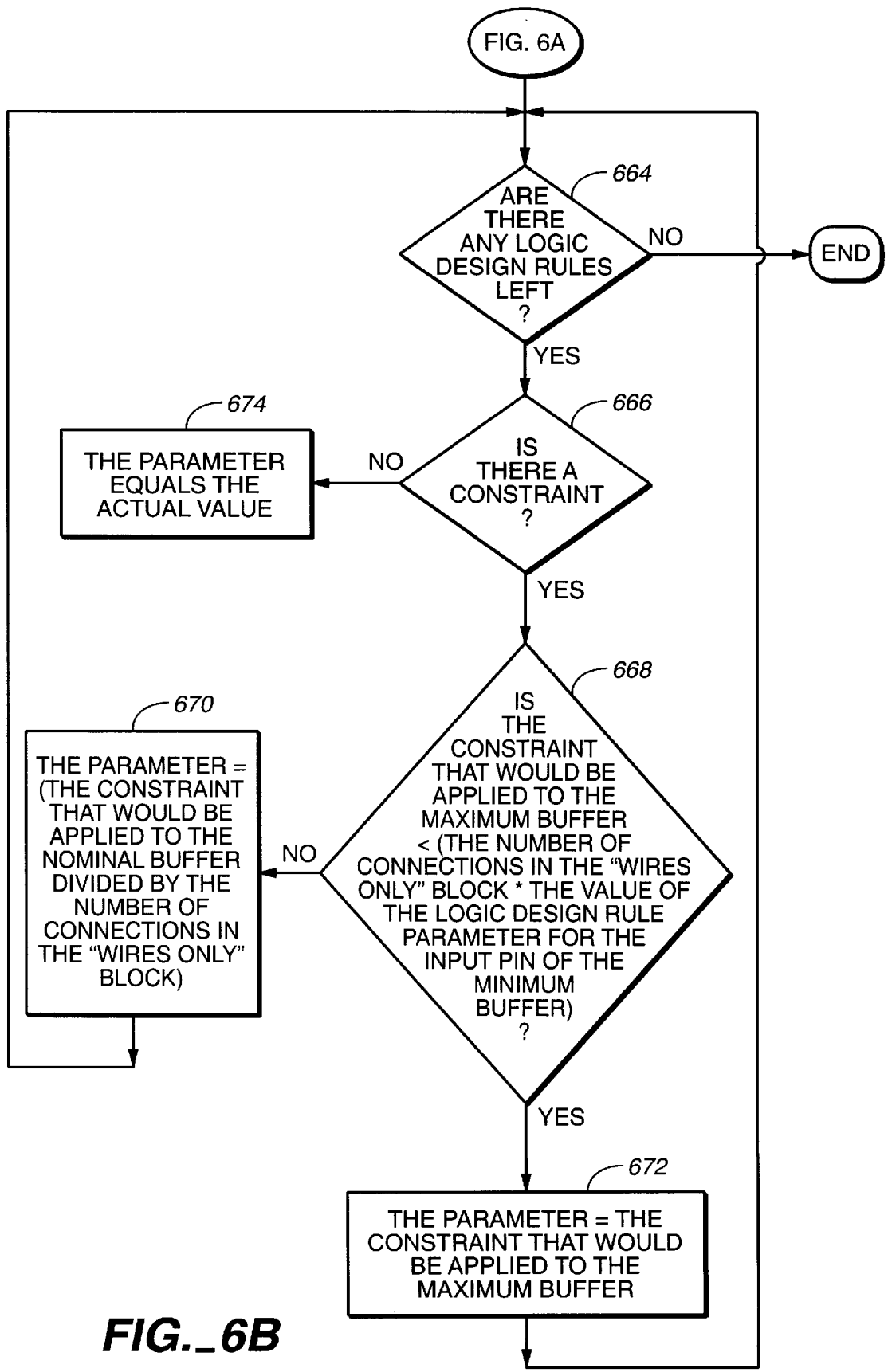
FIG._6B

LOGIC SYNTHESIS CONSTRAINTS ALLOCATION AUTOMATING THE CONCURRENT ENGINEERING FLOWS

BACKGROUND OF THE INVENTION

1. Field of the Invention

The present invention relates generally to a method and system for synthesizing a circuit design. More particularly, the invention relates to a method and system for concurrently synthesizing different parts of a circuit design by using budgeting technics to perform the timing and logic design rules constraints allocation.

2. State of the Art

Most conventional synthesis tools available to designers are able to handle circuit designs whose size can be up to 100,000 gate equivalents. A designer working on a chip with greater that 100,000 gate equivalents has to manually partition the circuit design into smaller pieces (e.g., sub-blocks) in order for conventional synthesis tools to operate on the entire circuit design. A design with sub-blocks is also referred to as a hierarchical design. Partitioning the circuit design into small sub-blocks is a common procedure for designers and allows conventional synthesis tools to synthesize the entire circuit design.

However, in the above procedure, it is difficult to derive the timing and logic design rules constraints from the top-level of the chip into budgeted local constraints applied to the sub-blocks. The budgeted constraints are the result of an allocation which foresees the nominal timing performance of the sub-blocks. The allocation of timing and logic design rules budgets is mandatory in order to load the sub-blocks in the synthesis tools and run several sub-block synthesis (eventually in parallel) instead of one full synthesis run on the whole design.

The operation of deriving global constraints into local constraints applied to a sub-block is referred to as the characterization of the corresponding sub-block. The operation of deriving the global constraints into budgeted local constraints is referred to as the timing and logic design rules constraints allocation.

The timing and logic design rules constraints allocation of a sub-block are useful when a team leader would like to assign each of his engineers to the synthesis of one sub-block. The engineers will work in parallel and each of them will need the timing and logic design rules constraint of his respective sub-block. In this situation, the timing and logic design rules constraints allocation of the sub-blocks should provide the scripts of the synthesis. As a result, this operation has to be done before the synthesis itself.

For a more detailed discussion of the above situation with respect to RTL Floorplanner tools, reference is made to co-pending U.S. application Ser. No. 08/921,361, titled "Method and System for Floorplanning a Circuit Design at a High Level of Abstraction," filed on Aug. 29, 1997, the content of which is hereby incorporated by reference in its entirety.

SUMMARY OF THE INVENTION

The present invention is thus directed to providing a synthesis tool which can automate the generation of the files used by a synthesis in order to be able to concurrently synthesize the different parts of a design.

Exemplary embodiments are directed to the use of budgeting technics to perform the timing and logic design rules constraints allocation.

According to exemplary embodiments of the present invention, the sub-blocks are not overconstrained with respect to the timing constraints. The timing constraints are allocated between each sub-block so that a reasonable budget of time is assigned to each of the sub-blocks.

With the budgeting technics of the present invention, the sub-blocks can be synthesized concurrently. That is, it is not necessary to wait for the end of the synthesis run of one sub-block to start the run of another one.

Exemplary embodiments of the present invention can be performed from with a RTL Floorplanner since it can be run from an estimated design as opposed to the actual characterization which has to be performed on the actual design.

BRIEF DESCRIPTION OF THE DRAWINGS

These and other advantages and objects of the invention will become more apparent from the following detailed description of preferred embodiments when read in conjunction with the attached Figures in which:

FIG. 1A illustrates a design process for implementing a circuit design;

FIG. 1B illustrates a block diagram of a hierarchical block of a circuit;

FIG. 2 illustrates an exemplary embodiment of the present invention;

FIG. 3 illustrates an exemplary embodiment of implementing block 212 of FIG. 2;

FIG. 4 illustrates an exemplary embodiment of a process for calculating the arrival time;

FIG. 5 illustrates an exemplary embodiment of a process for calculating the required time; and FIGS. 6A–6B illustrate an exemplary embodiment of a process for calculating the design rules constraints.

DETAILED DESCRIPTION OF THE PREFERRED EMBODIMENTS

An exemplary design process for implementing a circuit design according to the present invention is illustrated in FIG. 1A. The exemplary FIG. 1A process will be described in the context of the Register Transfer Level. In this regard, reference is made to the ChipPlannerCB User Guide, Compass Design Automation, Inc., August 1996; the ASIC Synthesizer User Guide, Compass Design Automation, Inc., September 1996; and the COMPASS Timing Analysis User Guide, Compass Design Automation, Inc., December 1996; the contents of which are hereby incorporated by reference in their entireties.

In step 100 of FIG. 1A, a designer arranges a floorplan of a circuit design at a high level of abstraction, such as the Register Transfer Level. Alternatively, VHDL or VERILOG may be used to represent a circuit at a high level of abstraction.

Next, the designer synthesizes the Register Transfer Level floorplan at step 102 which produces a rough netlist 104. The designer then optimizes the circuit at step 106 which produces the optimized netlist 108.

The optimization takes into account timing and logic design rule constraints. The timing and logic design rules constraints include the following four files:

(1) The wireload model file provides the definition and the scope of the wireload model. A wireload model is a statistical model which computes the capacitance of a node given its number of end points. A wireload model can be valid for the whole design or for a part of it. The part of the design on which a wireload model is valid is called the wireload model's scope.

(2) The budgeted timing constraints file defines the maximum or the minimum allowed time for a signal to go from one point to another. For example, the frequency of the clock network is a timing constraint. One goal of the synthesis step 102 is to modify the design topology so that the timing constraints are met. The timing constraints are usually known at the system level, e.g., before the a circuit is partitioned into sub-blocks. When the design is partitioned into sub-blocks the timing constraints have to be allocated along each sub-block and, hence one obtains the budgeted timing constraints.

(3) The budgeted logic design rules constraints file includes some of the rules that the design has to follow in order to correctly work with the technology in use. For example, the maximum capacitance of each node is a logic design rule constraint. One goal of the synthesis step 102 is to modify the design topology so that the logic design rules constraints are met. The logic design rules constraints are usually known at the system level, e.g., before the partitioning into sub-blocks. When the design is partitioned into sub-blocks, the logic design rules constraints have to be allocated for each sub-block and, hence one obtains the budgeted logic design rules constraints.

(4) The synthesis file runs the synthesis tool during the synthesis step 102. The synthesis toll loads the rough netlist 104 (design description) into it and then the wireload model files, the budgeted timing constraints files, and the budgeted logic design rules constraints files.

Some synthesis tools provide a characterization feature, which will be referred to as the actual characterization in order to distinguish it from the timing and logic design rules constraints allocation.

An actual characterization of a sub-block is reporting the actual timing and logic design rules values measured on the input and output pins of the sub-block, when the logic inside it is removed.

For example, with respect to the timing constraints of the design in FIG. 1B, the design has a path from the input connector IN, to the output connector OUT. This means that each time the electrical value of the connector IN is modified, the electrical value of OUT is reevaluated and may change as well. In this example, it is assumed that a timing analysis has been performed on this design and found the following result:

When the electrical value of IN is modified at the time t=0 ns, the electrical value of the intermediate node 107 might not change until time t=10 ns. In addition, the electrical value of OUT might not change until time t=30 ns. It is also assumed that there is a timing constraint on output OUT which requires OUT to be stable at time t=20 ns. Thus, the design of FIG. 1B violates the timing constraint by 10 ns.

It is assumed that removing the logic inside the sub-block B 105 increases the capacitance of the intermediate node 107 such that the arrival time measured from IN to node 107 becomes t=9 ns instead of t=10 ns. The actual characterization of the sub-block A would produce:

arrival time on IN of sub-block A 103 is 0 ns; and required time at the output of sub-block A (intermediate node 107) is 0 ns.

The actual characterization of sub-block B would produce:

arrival time on the IN of sub-block B 105 (intermediate node 107) is 9 ns; and required time on OUT of sub-block B 105 is 20 ns.

As one can appreciate from the above example, the resulting constraint applied to the sub-block A 103 is 0 ns and the resulting constraint applied to the sub-block B 105 is 11 ns. So if the sub-blocks A 103 and B 105 are synthesized concurrently with such constraints, and assuming the synthesis meets the respective constraints, the resulting design will have an arrival time to OUT at time t=11 ns. In other words, the design has been overconstrained, which is undesirable.

For each sub-block characterized with this method, the values reported in the timing and the logic design rules files come from the analysis of the parts of the design which are outside the sub-block. Since those parts of design are also subject to be changed (by another team or by another synthesis process) the values of the scripts are not meaningful and do not provide a desirable set of constraints for the synthesis run.

Moreover the actual characterization cannot be done from a RTL Floorplanner because it requires an accurate description of the design which is unavailable in this tool.

The timing and logic design rules constraints allocation using budgeting technics of the present invention is performed on a virtual design. The virtual design can be referred to as a graph which symbolizes the expected implementation of the actual design, and which is made by an estimator. If the actual design is available, it is possible to perform the timing and logic design rules constraints allocation on it. However, it is also possible that the graph nodes are equivalent to blocks of the design (however, the estimation would give less details).

The practice of the present invention does not require the estimation process. It is assumed that it is possible to derive from it a concrete representation of an electrical network which has the same functionality of the target design, or a block level representation of the target design. It is not expected that any optimization nor buffering technics are used to get this representation, although this can be done.

With respect to FIG. 2, once the virtual design is represented in memory, the timing and logic design rules constraints allocation is made in two steps.

The first step 210 aims at preparing the virtual timing performance. That is, the expected timing and logic design rules numbers are annotated on each node of the virtual design. The timing numbers are any value which indicates the time that the electrical signal takes to propagate through the node. The logic design rules numbers are any number reflecting the graph topology and which are a controllable parameter in the conventional optimizer tools, e.g., node capacitance and number of endpoints on the edges.

Once the design representation is in memory, it is annotated with the virtual node capacitance. The virtual node capacitance is the innovative way to get the virtual timing performance.

The virtual capacitance of a node is the capacitance that the node would have if it had a few gates connected to it, e.g., 3 or 4. The operation of the invention, however, is not changed if the number of gates is higher. However, if the timing constraints are quite tight, the number of gates driven by each gate along the critical path will not exceed 3 or 4 (otherwise a buffer tree may be needed).

The virtual gate timing performance is the gate timing computed the virtual capacitance has been calculated from all of the nodes. After completion of the virtual timing performance 210, a conventional timing tracer will be able to calculate the virtual timing performance of any path.

One additional attribute that can be set on the virtual design is the budget/actual attribute. Therefore, if a part of the virtual design is the actual design (for example a library block) the attribute will be actual. The virtual capacitance of the nodes inside such blocks is the therefore, the true capacitance. The virtual capacitance of the nodes at the bounds of such blocks is made of the sum of the true capacitance inside the block and of the truncated part of the capacitance outside the block.

The second step 212 aims at allocating timing and logic design rules budget to a specified block. With respect to FIG. 3, the timing constraints allocation consists of:

1) translate global settings 314 (e.g., set clock or set path cluster xx); and
2) translate arrival times 316.

The arrival times are computed by scaling the scalable part of the path so that the total path meets the required time.

The translation of the arrival times is described in more detail with respect to FIGS. 4–5.

The method of FIG. 4 calculates the arrival time for each input connector of the block, step 418.

The timing is traced through the virtual design with a conventional timing tracer for each input connector of the block 420. The scalable arrival time (sc_arrival) equals the path length of budget gates to the input 422. The actual arrival time (ac_arrival) equals the path length of the actual gates to the input 424. The scalable total (sc_total) equals the path length of the budget gates to the end of the path 426. The actual total (ac_total) equals the path length of actual gates to the end of the path 428. The scalable required time (sc_req_total) equals the required total time minus the actual total (ac_total) 430. A coefficient (coef) is then calculated 432. The coefficient (coef) equals the scalable required time divided by the scalable total (sc_req_total/sc_total).

The arrival time for the input connector for the block equals the scalable total time the coefficient plus the actual arrival (sc_arrival * coef+ac_arrival) 434.

The method of FIG. 5 calculates the required time for each output connector of the block, step 536.

The timing is traced through the virtual design with a conventional timing tracer for each output connector of the block 538. The scalable required time (sc_req) equals the path length of budget gates from the output to the end of the path 540. The actual arrival time (ac_arrival) equals the path length of the actual gates from the output to the end of the path 542. The scalable total (sc_total) equals the path length of the budget gates to the end of the path 544. The actual total (ac_total) equals the path length of actual gates to the end of the path 546. The scalable required time (sc_req_total) equals the required total time minus the actual total (ac_total) 548. A coefficient (coef) is then calculated 550. The coefficient (coef) equals the scalable required time divided by the scalable total (sc_req_total/sc_total).

The required time for the output connector for the block equals the scalable required time minus the actual arrival time minus the product of the scalable required time and the coefficient (sc_req_total−ac_req)−(sc_req * coef) 552.

The logic design rules consists of constraints of 3 types:
(1) global node constraints;
(2) gate specific constraints; and
(3) external constraints.

The global node constraints define a limit for a given parameter whose characteristic is that it can be computed for a node, e.g., maximum capacitance, fanout, and ramp delay. This limit is applied to all the nodes of the design.

The gate specific constraints define a limit for a given parameter whose characteristic is that it can be computed for a node, and this limit is applied to any node driven by the given gate.

The external constraints: they define a limit for a given parameter whose characteristic is that it can be computed for a node, and this limit is applied to any node connected to an input or an output of the design.

The problem of deriving logic design rules comes from its desired use. If the characterized blocks or cells are supposed to be put together after being optimized separately and then globally re-buffered, the problem of characterizing design rules disappear. That is, any remaining logic design rules violation would be corrected in this operation. The goal is to get no design rules violations when the blocks are put together to form the overall design.

One additional attribute that can be set on the virtual design is the attribute "only wires/wires and gates" which is set on different hierarchical blocks. When the setting of "only wires" is on a block, this block is supposed to contain only wires interconnecting hierarchical blocks. Such a block is supposed to be frozen, i.e., no gates will be added there. This constraint can result in an impossible constraint. For example, if there is a wire going into 10 hierarchical sub-blocks, such a wire has a fanout at least equal to 9. If the maximum fanout is 8, it has already violated the constraint and will never be fixed since no gate will be added in the corresponding block. This case is supposed to be exceptional and will have to be handled through an exceptional procedure anyway. The goal of the characterization of logic design rules is to work correctly in all other cases.

The global constraints are translated with no modification. In addition, the cell specific constraints are translated with no modification. FIGS. 6A and 6B illustrate the method of determining the external connector constraints.

The method of determining the constraints is repeated for each connector on which a constraint applies for each logic design rule 654, 656.

(1) cons_dmax equals the constraint that would be applied to the maximum buffer;
(2) cons_dmin equals the constraint that would be applied to the minimum buffer;
(3) param_dmin equals the value of the logic design rule parameter for the input pin of the minimum buffer;
(4) for each connector on which constraint applies (either input or output connectors):
   ac_ldr_param equals the actual logic design rule parameter value;
   sc_ldr_param equals the scalable logic design rule parameter value;
   cons equals the logic design rules constraint for the node;
   num equals the number of connection in the "wires only" block;
   if there is no constraint, then the next logic design rule is checked 656;
   if cons_dmax<num * param_dmin then the constraint equals cons_dmin 662;
   otherwise the constraint=cons_dmax/num 660.

With respect to FIG. 6B, for each logic design rule 664:
cons_dmax equals the constraint that would be applied to the maximum buffer;
cons_dnom equals the constraint that would be applied to a nominal buffer;
cons_dmin equals the constraint that would be applied to a minimum buffer;
param_dmin equals the value of the logic design rule parameter for the input pin of the minimum buffer for each connector on which parameters can be set (either input or output connectors);

ac_ldr_param equals the actual logic design rule parameter value;

sc_ldr_param equals the scalable logic design rule parameter value;

cons equals the logic design rules constraint for the node;

num equals the number of connections in a "wires only" block;

if there is no constraint 666, then the parameter equals the actual value 674;

if cons_dmax<num * param_dmin 668, then the parameter equals cons_dmax 672;

otherwise the parameter equals cons_dnom/num 670.

The above-described planning technique can be performed on a general or special purpose computer implementing program code, as will be appreciated to one skilled in the art. Each of the identified steps in the flowcharts may correspond to a module of program code. Alternatively, the functions described herein can be implemented wholly or partly by discrete logic circuitry.

While the foregoing exemplary embodiments have been described in terms of a Register Transfer Level floorplanner, it should be understood that the invention is also applicable to circuit design at other high levels of abstraction, e.g., VERILOG and VHDL. It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method of allocating a timing budget established for a circuit design, said circuit design including a plurality of blocks each having a path, said method comprising the steps of:

preparing a timing analysis of said circuit; and automatically allocating said timing budget to one of said plurality of blocks in said circuit, and performing said timing evaluation with respect to said one of said plurality of blocks, wherein said step of automatically allocating includes the steps of:
(a) determining, for said one of said plurality of blocks, a path length of budget gates from an output to an end of said path;
(b) determining a path length of actual gates from said output to said end of said path;
(c) determining a path length of budget gates to the end of said path;
(d) determining a path length of actual gates to said end of said path;
(e) determining a required total time minus the result from step (d);
(f) determining a coefficient by dividing the result of step (e) by the result of step (c); and
(g) determining the required time by subtracting the product of the results of step (e) and step (f) from the difference of the results of step (b) and step (e).

2. A method of allocating a timing budget established for a circuit design, said circuit design including a plurality of blocks each having a path, said method comprising the steps of:

preparing a timing analysis of said circuit; and automatically allocating said timing budget to one of said plurality of blocks in said circuit, and performing said timing evaluation with respect to said one of said plurality of blocks, wherein said step of automatically allocating includes the steps of:
(a) determining for said one of said plurality of blocks, a path length of budget gates from an input to an end of said path;
(b) determining a path length of actual gates from said input;
(c) determining a path length of budget gates to the end of said path;
(d) determining a path length of actual gates to said end of said path;
(e) determining a required total time minus the result from step (d);
(f) determining a coefficient by dividing the result of step (e) by the result of step (c); and
(g) determining the arrival time by adding the product of the results of step (a) and step (f) by the result of step (b).

3. A system for allocating a timing budget established for a circuit design, said circuit design including a plurality of blocks each having a path, said system comprising:

a first means for preparing a timing analysis of said circuit; and a second means for automatically allocating said timing budget to one of said plurality of blocks in said circuit, and performing said timing analysis with respect to said one of said plurality of blocks, wherein said second means further includes:
a third means for determining, for said one of said plurality of blocks, a path length of budget gates from an output to an end of said path;
a fourth means for determining a path length of actual gates from said to said end of said path;
a fifth means for determining a path length of budget gates to the end of said path;
a sixth means for determining a path length of actual gates to said end of said path;
a seventh means for determining the difference of a required total time and the result of the sixth means;
an eighth means for determining a coefficient by dividing the result of the seventh means by the result of the fifth means; and
a ninth means for determining the required time by subtracting the product of the results of the seventh means and the eighth means from the difference of the result of the fourth means and the seventh means.

4. A system for allocating a timing budget established for a circuit design, said circuit design including a plurality of blocks each having a path, said system comprising:

a first means for preparing a timing analysis of said circuit; and a second means for automatically allocating said timing budget to one of said plurality of blocks in said circuit, and performing said timing analysis with respect to said one of said plurality of blocks, wherein said second means further includes:
third means for determining, for said one of said plurality of blocks, a path length of budget gates from an input to an end of said path;
fourth means for determining a path length of actual gates from said input;
fifth means for determining a path length of budget gates to the end of said path;

sixth means for determining a path length of actual gates to said end of said path;

seventh means for determining a required total time minus the result from the sixth means;

eighth means for determining a coefficient by dividing the result of the seventh means by the result of the fifth means; and ninth means for determining the arrival time by adding the product of the results of the third means and the eighth means to the result of the second means.

5. A method of allocating a timing budget established for a circuit design, said circuit design including a plurality of blocks each having a path, said method comprising the steps of:

preparing a timing analysis of said circuit; and automatically allocating said timing budget to one of said plurality of blocks in said circuit, and performing said timing evaluation with respect to said one of said plurality of blocks, wherein said circuit design includes at least one logic design rule and at least one associated constraint, wherein said step of automatically allocating includes the steps of:

(a) determining a constraint that would be applied to a maximum buffer;

(b) determining a constraint that would be applied to a minimum buffer;

(c) determining a value of parameter for an input pin of said minimum buffer; and (d) repeating for each associated constraint of each logic design rule the following steps:

if the result from step (a) is less than the product of the number of connectors of said block and the result of step (c), then said associated constraint is set to the result of step (b), otherwise said associated constraint is set to the result of step (a) divided by the number of connectors of said block.

6. A method of allocating a timing budget established for a circuit design, said circuit design including a plurality of blocks each having a path, said method comprising the steps of:

preparing a timing analysis of said circuit; and automatically allocating said timing budget to one of said plurality of blocks in said circuit, and performing said timing evaluation with respect to said one of said plurality of blocks, wherein said circuit design includes at least one logic design rule and at least one associated constraint, wherein said step of automatically allocating includes the steps of:

(a) determining a constraint that would be applied to a maximum buffer;

(b) determining a constraint that would be applied to a nomimal buffer;

(c) determining a constraint that would be applied to a minimum buffer;

(d) determining a value of parameter for an input pin of said minimum buffer; and (e) repeating for each associated constraint of each logic design rule the following steps:

if the result from step (a) is less than the product of the number of connectors of said block and the result of step (c), then said associated constraint is set to the result of step (a), otherwise said associated constraint is set to the result of step (b) divided by the number of connectors of said block.

7. A system for allocation a timing budget established for a circuit design, said circuit design including a plurality of blocks, said system comprising:

means for preparing a timing analysis of said circuit; and means for automatically allocating said timing budget to one of said plurality of blocks in said circuit and performing said timing evaluation with respect to said one of said plurality of blocks;

wherein said circuit design includes at least one logic design rule and at least one associated constraint, wherein said means for automatically allocating further comprises:

(a) means for determining a constraint that would be applied to a maximum buffer;

(b) means for determining a constraint that would be applied to a minimum buffer;

(c) means for determining a value of parameter for an input pin of said minimum buffer;

(d) means for repeating for each associated constraint of each logic design rule the following:

if the result from (a) is less than the product of the number of connectors of said block and the result of (c), then said associated constraint is set to the result of (b), otherwise said associated constraint is set to the result of (a) divided by the number of connectors of said block.

8. A system for allocation a timing budget established for a circuit design, said circuit design including a plurality of blocks, said system comprising:

means for preparing a timing analysis of said circuit; and means for automatically allocating said timing budget to one of said plurality of blocks in said circuit and performing said timing evaluation with respect to said one of said plurality of blocks;

wherein said circuit design includes at least one logic design rule and at least one associated constraint, wherein said means for automatically allocating further comprises:

(a) means for determining a constraint that would be applied to a maximum buffer;

(b) means for determining a constraint that would be applied to a nominal buffer;

(c) means for determining a constraint that would be applied to a minimum buffer;

(d) means for determining a value of parameter for an input pin of said minimum buffer;

(e) means for repeating for each associated constraint of each logic design rule the following:

if the result from (a) is less than the product of the number of connectors of said block and the result of (c), then said associated constraint is set to the result of (a), otherwise said associated constraint is set to the result of (b) divided by the number of connectors of said block.

* * * * *